(12) United States Patent
Wang et al.

(10) Patent No.: US 7,605,567 B2
(45) Date of Patent: Oct. 20, 2009

(54) BATTERY PROTECTING CIRCUIT AND BATTERY WITH SUCH PROTECTING CIRCUIT

(75) Inventors: Bing Wang, Shenzhen (CN); Chao-Hung Ma, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 420 days.

(21) Appl. No.: 11/681,732

(22) Filed: Mar. 2, 2007

(65) Prior Publication Data
US 2008/0212251 A1  Sep. 4, 2008

(51) Int. Cl.
H02J 7/00 (2006.01)
G01N 27/416 (2006.01)
G08B 21/00 (2006.01)
H02H 3/24 (2006.01)
H01H 73/00 (2006.01)

(52) U.S. Cl. .............. 320/136; 320/127; 320/134; 324/426; 361/92; 361/115; 340/636.1; 340/636.21

(58) Field of Classification Search ................ 320/127, 320/134, 136; 324/426; 361/115
See application file for complete search history.

(56) References Cited

U.S. PATENT DOCUMENTS 6,127,808 A * 10/2000 Sudo et al. ................. 320/134
6,208,117 B1 * 3/2001 Hibi ............................ 320/134
6,404,261 B1   6/2002 Grover et al.
6,804,100 B2  10/2004 Astala
7,019,493 B2   3/2006 Astala
7,276,881 B2 * 10/2007 Okumura et al. ............ 320/134

OTHER PUBLICATIONS

Che-Chang Yang. Introduction to Kionix KXM52-1050 Tri-Axial Accelerometer. Gerontechnology Research Center, Jan. 2, 2006, TW.

* cited by examiner

Primary Examiner—Edward Tso
Assistant Examiner—Yalkew Fantu
(74) Attorney, Agent, or Firm—Frank R. Niranjan

(57) ABSTRACT

A protecting circuit for a battery used to power an electronic system includes a control circuit and a sensing circuit. The sensing circuit includes a tri-axial accelerometer having X, Y and Z axes. The tri-axial accelerometer is capable of detecting position changes of the battery and outputs through the X, Y and Z axes voltages that correspond to the position changes. The sensing circuit ultimately outputs a controlling voltage to the control circuit according to the voltages outputted by the X, Y and Z axes. When the battery is being installed onto or uninstalled from the electronic system, the outputted controlling voltage makes the control circuit OFF and the battery cannot power the electronic system. When the battery have been installed onto the electronic system, the outputted controlling voltage turns the control circuit ON and the battery can supply power to the electronic system.

15 Claims, 3 Drawing Sheets

BATTERY PROTECTING CIRCUIT AND BATTERY WITH SUCH PROTECTING CIRCUIT

BACKGROUND OF THE INVENTION

1. Field of the Invention

The present invention relates generally to a battery protecting circuit, and more particularly to a battery protecting circuit being used for protecting a battery from generating electrical sparks when the battery is installed or uninstalled. The present invention also relates to a battery with the battery protecting circuit.

2. Description of Related Art

As our world becomes more technologically advanced, the demand for electrical power becomes more sophisticated. With respect to electronic devices, such as notebook computers, tablet computers, personal digital assistants (PDAs), digital still/dynamic cameras, etc, there is increasing demand for increased duration of electrical power supply for these electronic devices.

Conventionally, these electronic devices rely on batteries or are electrically connected to an AC/DC power adaptor to get power. The power adaptor needs to be connected to a fixed electrical outlet via electrical lines and thus is not convenient for outdoor uses. As batteries are designed to have a greater capacity, use of batteries to power the electronic devices has become increasingly common. However, electrical sparks is prone to be generated when the battery is installed onto or uninstalled from the battery-powered electronic devices, for the electrical connection between the battery and the electronic devices is unstable during installation or uninstallation. The electrical sparks so generated may cause some harms, for example, burning out the battery, damaging the electronic device, or may even be a danger to the user.

It is therefore desirable to provide a battery protecting circuit which can protect a battery from generating electrical sparks when the battery is installed onto or uninstalled from a battery-powered electronic device, thereby overcoming the above mentioned problems.

SUMMARY OF THE INVENTION

The present invention relates to a battery protecting circuit for controlling power supply of a battery to a system. In an exemplary embodiment of the present invention, the battery is used to power an electronic system, and the protecting circuit includes a control circuit and a sensing circuit. The sensing circuit includes a tri-axial accelerometer having X, Y and Z axes. The tri-axial accelerometer is capable of detecting position changes of the battery and outputs through the X, Y and Z axes voltages that correspond to the position changes. The sensing circuit ultimately outputs a controlling voltage to the control circuit according to the voltages outputted by the X, Y and Z axes. When the battery is in an unstable state, for example, when the battery is being installed onto or uninstalled from the electronic system, the controlling voltage makes the control circuit OFF and the battery cannot power the electronic system. When the battery is in a stable state, for example, when the battery have been installed onto the electronic system, the controlling voltage makes the control circuit ON and the battery supplies power to the system.

The advantages of this invention can be more readily ascertained from the following description of the exemplary embodiment(s) of the invention when read in conjunction with the accompanying drawings.

BRIEF DESCRIPTION OF THE DRAWINGS

Many aspects of the battery protecting circuit can be better understood with reference to the following drawings. In the drawings, like reference numerals designate corresponding parts throughout the several views.

DETAILED DESCRIPTION OF THE INVENTION

Figure 1:
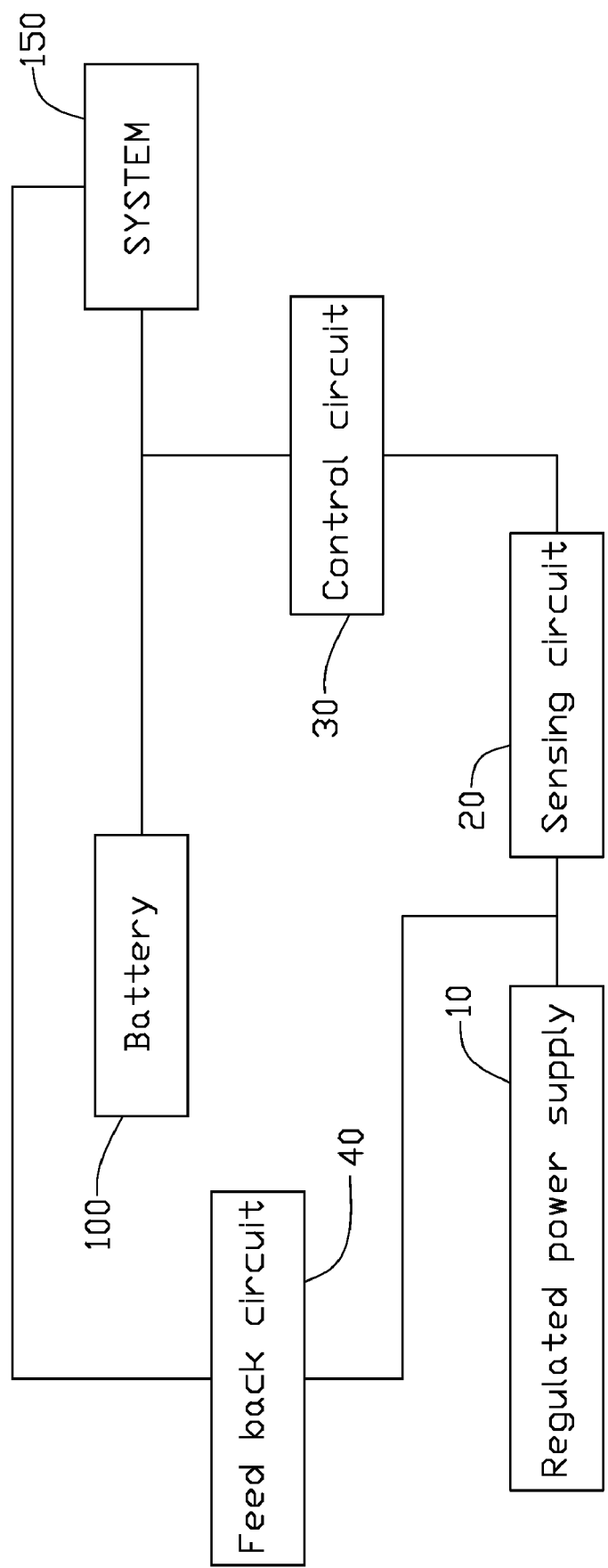
FIG. 1 is a functional block diagram of a battery protecting circuit in accordance with a preferred embodiment of the present invention.

Referring to FIG. 1, a functional block diagram of a battery protecting circuit interconnected between a smart battery 100 and a system 150 is shown according to a preferred embodiment of the present invention. The protecting circuit can protect the battery 100 from generating electrical sparks when the battery 100 is being installed onto or uninstalled from the system 150. The system 150 can be a portable electronic device such as a notebook computer, a tablet personal computer, a UMPC (Ultra Mobile PC) and other electronic devices. The protecting circuit includes a regulated power supply 10, a sensing circuit 20, a control circuit 30 and a feedback circuit 40.

Figure 2:
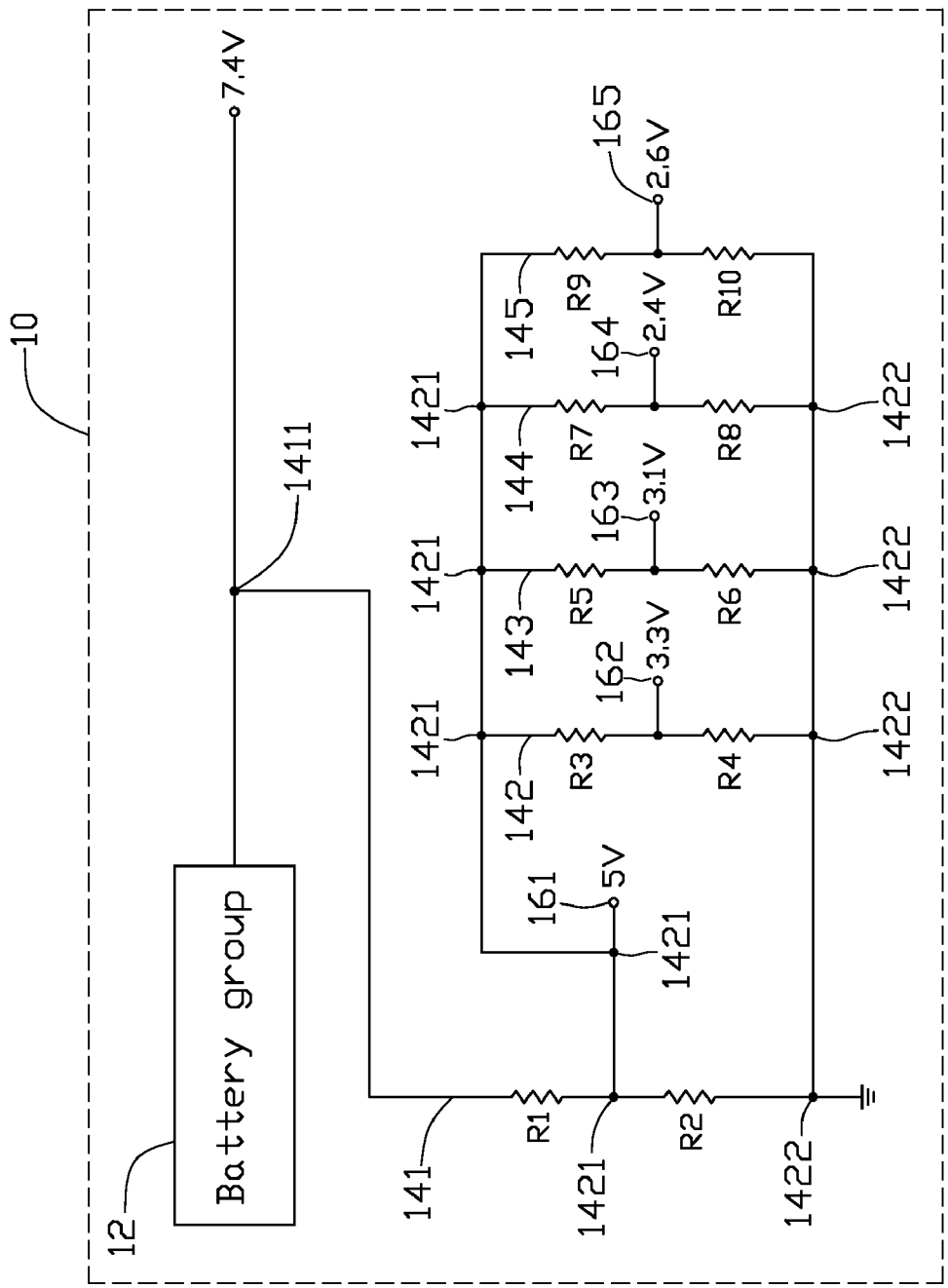
FIG. 2 is a detailed circuit diagram of a regulated power supply according to an example of the battery protecting circuit of FIG. 1.

Referring to FIG. 2, the regulated power supply 10 includes a battery group 12, a plurality of dividing circuits 141, 142, 143, 144, 145 and a plurality of voltage output terminals 161, 162, 163, 164, 165 each outputting a different voltage. The dividing circuits include a first dividing circuit 141 which is composed of two serially connected resistors R1, R2, a second dividing circuit 142 which is composed of two serially connected resistors R3, R4, a third dividing circuit 143 which is composed of two serially connected resistors R5, R6, a fourth dividing circuit 144 which is composed of two serially connected resistors R7, R8, and a fifth dividing circuit 145 which is composed of two serially connected resistors R9, R10. The first dividing circuit 141 is electrically connected to the battery group 12 at a junction 1411, and the other dividing circuits 142, 143, 144, 145 are connected in parallel between two junctions 1421, 1422, wherein the junction 1421 is coupled to a junction between the resistors R1, R2 and the junction 1422 is tied to ground. The voltage output terminals 161, 162, 163, 164, 165 are each electrically connected to a junction between the two resistors of a corresponding dividing circuit 141, 142, 143, 144, or 145. Specifically, the first voltage output terminal 161 is connected to a junction between the two resistors R1, R2 of the first dividing circuit 141, the second voltage output terminal 162 is connected to a junction between the two resistors R3, R4 of the second dividing circuit 142, the third voltage output terminal 163 is connected to a junction between the two resistors R5, R6 of the third dividing circuit 143, the fourth voltage output terminal 164 is connected to a junction between the two resistors R7, R8 of the fourth dividing circuit 144, and the fifth voltage output terminal 165 is connected to a junction between the two resistors R9, R10 of the fifth dividing circuit 145. The outputting voltage of each output terminal 161, 162, 163, 164, or 165 can be regulated according to electrical resistances of the resistors (R1, R2) (R3, R4) (R5, R6) (R7, R8) (R9, R10) of the dividing circuits 141, 142, 143, 144, 145.

Figure 3:
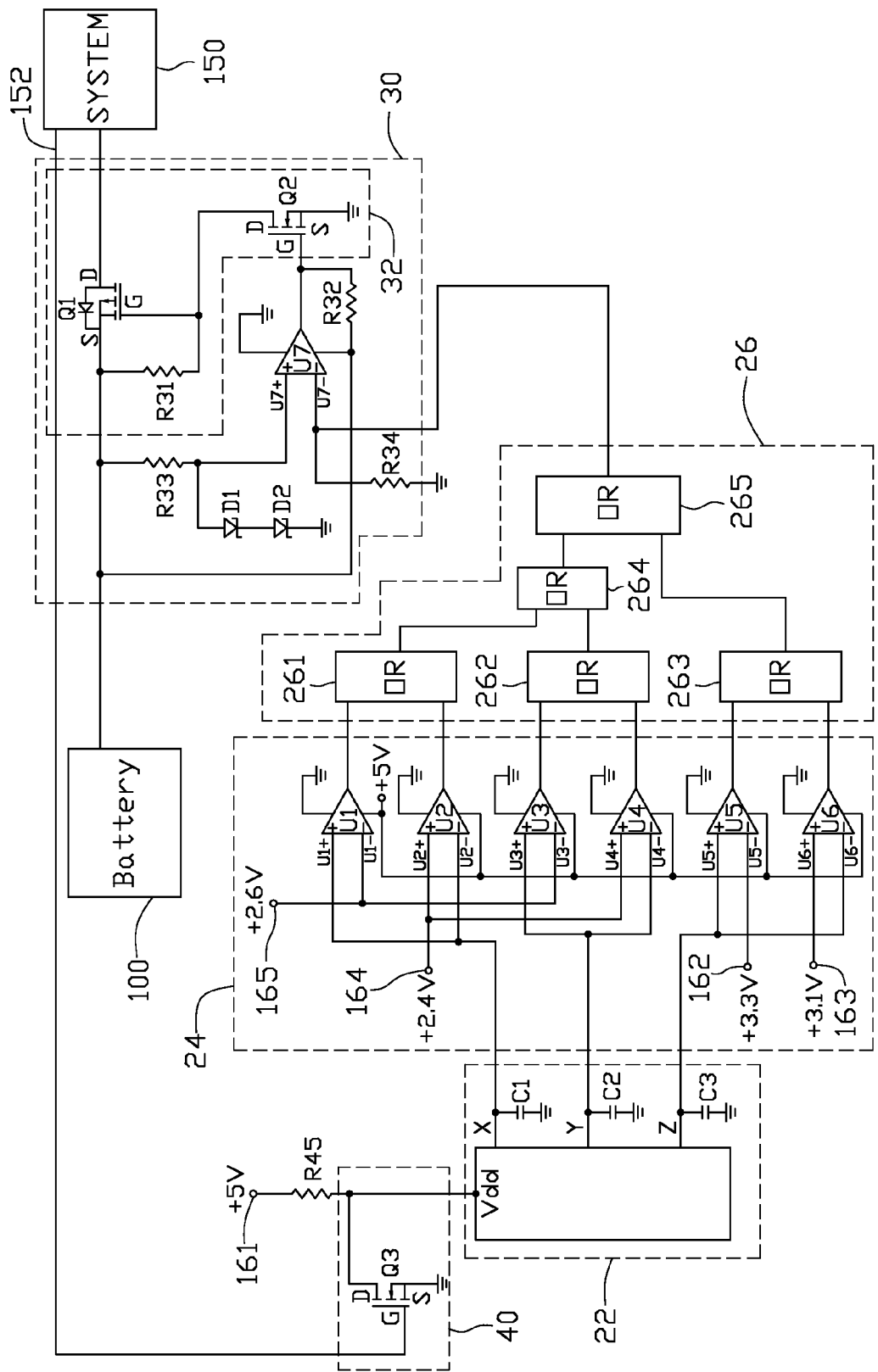
FIG. 3 is a detailed circuit diagram according to an example of the battery protecting circuit of FIG. 1.

Referring to FIG. 3, the sensing circuit 20 includes a tri-axial accelerometer 22, a comparing circuit 24 and a choosing circuit 26. The tri-axial accelerometer 22 has a sensing element and a CMOS (Complementary Metal-Oxide Semiconductor) signal conditioning ASIC (Application Specific Integrated Circuit) packaged therein. The tri-axial accelerometer 22 functions on the principle of differential capacitance. Acceleration causes displacement of a silicon structure resulting in a change in capacitance. A signal-conditioning CMOS technology ASIC detects and transforms changes in capacitance into an analogue voltage which is proportional to acceleration. Such a typical tri-axial accelerometer may refer to Kionix KXM52-1050, a model made by Kionix, Inc., a US-based company. The tri-axial accelerometer 22 has three axes as its output terminals, namely, X-axis, Y-axis and Z-axis, which are electrically connected to the comparing circuit 24. The tri-axial accelerometer 22 has a power supply pin $V_{dd}$ which is electrically connected to the first voltage output 161 of the regulated power supply 10 via a resistor R45. There are three sensors in the tri-axial accelerometer 22 for measuring the accelerations of the battery 100 along the X, Y, and Z axes, respectively. The output voltages of the X, Y and Z axes change in response to position changes of the battery 100. The sensing range of the tri-axial accelerometer 22 for each of the X, Y and Z axes is ±2 g and the output varies with acceleration linearly in the rate of 660 mV/g, here mV is milliVolts and g is the acceleration due to gravity. The relationship can be shown by the equation: $V_{out(x,y,z)} = V_{off} \pm 660$ mV×g. If there is no acceleration applied along an axis, the output voltage $V_{off}$ equals half of the voltage applied on the power supply pin $V_{dd}$. If acceleration exists toward positive direction, the output voltage increases ($V_{out} > V_{off}$) and if acceleration exists toward negative direction, the output voltage decreases ($V_{out} < V_{off}$). In this embodiment, the supply voltage of the power supply pin $V_{dd}$ supplied by the first voltage output is assumed to be 5V. When the tri-axial accelerometer 22 is in a horizontal position and immobile, there are no gravitational effects along X or Y axis, and the X-axis and the Y-axis each output a voltage of 2.5V, but only 1 g vertical acceleration along the negative of Z-axis is detected whose effect can be regarded as the accelerometer moving in positive direction of Z-axis. In this condition, the voltage outputted by the Z-axis is $V_{out(z)} = V_{off} + 660$ mV, which equals 3.2V.

The comparing circuit 24 includes six comparators U1, U2, U3, U4, U5, U6. The comparators U1, U2, U3, U4, U5, U6 each have two input terminals (a non-inverting input node U+ and an inverting input node U_) electrically connected to the three axes of the tri-axial accelerator 22, and an output terminal outputting a comparing result between the two input terminals. The comparators U1, U2, U3, U4, U5, U6 each compares the voltages applied onto their own two input terminals U_, U_+, and then outputs the comparing result through their own output terminal. When the voltage applied to the inverting input node U_ is lower than that applied to the non-inverting input node U_+, the comparing result is a high level voltage of 5V. Conversely, when the voltage applied to the inverting input node U_ is higher than that applied to the non-inverting input node U_+, the comparing result is a low level voltage of 0V. Specifically, the X-axis is electrically connected to the non-inverting input node U1_+ of the first comparator U1 and the inverting input node U2_ of the second comparator U2, the Y-axis is electrically connected to the non-inverting input node U3_+ of the third comparator U3 and the inverting input node U4_ of the fourth comparator U4, and the Z-axis is electrically connected to the non-inverting input node U5_+ of the fifth comparator U5 and the inverting input node U6_ of the sixth comparator U6. The six comparators U1, U2, U3, U4, U5, U6 can be divided into three groups according to their connecting relationships with respect to the three axes of the tri-axial accelerometer 22. In this case, the first and second comparators U1, U2 belong to group I because they both have an input terminal connected to the X-axis as described above. Similarly, the third and fourth comparators U3, U4 belong to group II, the fifth and sixth comparators U5, U6 belong to group III. The other input terminals U1_, U2_+, U3_, U4_+, U5_, U6_+ of these comparators U1, U2, U3, U4, U5, U6 are electrically connected to corresponding voltage output terminals 162, 163, 164, 165 of the regulated power supply 10. Specifically, the inverting input nodes U1_, U3_ of the first and third comparators U1, U3 both are connected to the fifth voltage output terminal 165, the non-inverting input node U2_+, U4_+ of the third and fourth comparators U3, U4 both are connected to the fourth voltage output terminal 164, the inverting input node U5_ of the fifth comparator U5 is connected to the second voltage output terminal 162, and the non-inverting input node U6_+ of the sixth comparator U6 is connected to the third voltage output terminal 163.

As mentioned above, when the tri-axial accelerometer 22 is in a horizontal position and immobile, the X and Y axes each output a voltage of 2.5V, and the Z-axis outputs a voltage of 3.2V. In this embodiment, in order to enable the tri-axial accelerometer 22 to be capable of detecting the acceleration along each axis, the second voltage output terminal 162 of the regulated power supply 10 is designed to output a voltage of 3.3V, which is a little larger than 3.2V, the third voltage output terminal 163 is designed to output a voltage of 3.1V, which is a little smaller than 3.2V. Similarly, the fourth voltage output terminal 164 is selected to output a voltage of 2.4V, which is a little smaller than 2.5V, and the fifth voltage output terminal 165 is selected to output a voltage of 2.6V, which is a little larger than 2.5V.

The voltages 5V, 2.6V, 2.4V, 3.3V, 3.1V applied to the power supply pin $V_{dd}$ of the tri-axial accelerometer 22 and the corresponding input terminals of the comparators U1, U2, U3, U4, U5, U6 are provided by the regulated power supply 10. Referring back to FIG. 2, the battery group 12 of the regulated power supply 10 is capable of providing a maximal voltage of 7.4V. As a result, the resistance value of each of the resistors R1, R2, R3, R4, R5, R6, R7, R8, R9, R10 in the diving circuits 141, 142, 143, 144, 145 can be properly determined in order to gain the desired voltage outputs from the voltage output terminals 161, 162, 163, 164, 165.

The choosing circuit 26 includes five OR gates 261, 262, 263, 264, 265 electrically connected between the comparing circuit 24 and the control circuit 30, wherein each of the OR gates 261, 262, 263, 264, 265 has two input terminals and an output terminal. In this embodiment, the output terminals of the comparators U1, U2 in group I are electrically connected to the two input terminals of the first OR gate 261, the output terminals of the comparators U3, U4 in group II are electrically connected to the two input terminals of the second OR gate 262, and the output terminals of the comparators U5, U6 in group III are electrically connected to the two input terminals of the third OR gate 263. Furthermore, the output terminals of the first and second OR gates 261, 262 are electrically connected to the two input terminals of the forth OR gate 264, the output terminals of the third and fourth OR gates 263, 264 are electrically connected to the two input terminals of the fifth OR gate 265, and the output terminal of the fifth OR gate 265 is electrically connected to the control circuit 30. The characteristic of an OR gate is that it outputs a low level voltage of 0V when the voltage applied to each of its two input terminals is at a low level of 0V, and outputs a high level voltage when at least one of the two input terminals is applied with a high level voltage. Thus when one of the comparators U1, U2, U3, U4, U5, U6 outputs a high level voltage of 5V, the fifth OR gate 265 will eventually output a high level voltage of 5V through its output terminal.

The control circuit 30 includes a comparator U7 having the same working principle as with the comparators U1, U2, U3, U4, U5, U6 in the comparing circuit 24, and a switching circuit 32 electrically connected with the comparator U7. The inverting-input node U7_ of the comparator U7 is electrically connected to the output terminal of the fifth OR gate 265, and the non-inverting input node U7$_+$ of the comparator U7 is electrically connected to the battery 100 through a resistor R33. Two schottky barrier diodes D1, D2 are connected in series between the non-inverting input node U7$_+$ and ground (GND). The inverting-input node U7_ of the comparator U7 is also connected to ground (GND) via a resistor R34. Assuming that a voltage drop across each of the schottky barrier diodes D1, D2 is 0.4V, the voltage applied on the non-inverting input node U7$_+$ of the comparator U7 will be 0.8V. That is to say, when the battery 100 is in an unstable state, at least one of the three axes of the tri-axial accelerometer 22 will exceed the voltage range of 2.4V~2.6V (for X and Y axes) or the voltage range of 3.1V~3.3V (for Z-axis), then at least one of the comparators U1, U2, U3, U4, U5, U6 will output a high level voltage of 5V, and finally the fifth OR gate 265 will output a high level voltage of 5V. Since the high level voltage of 5V outputted by the output terminal of fifth OR gate 265 is directly applied to the inverting-input node U7_ of the comparator U7, the comparator U7 will output a low level voltage of 0V through its output terminal to the switching circuit 32 as 5V is larger than the 0.8V voltage applied on the non-inverting input node U7$_+$. Conversely, the fifth OR gate 265 will output a low level voltage of 0V at the inverting-input node U7_ of the comparator U7, which is smaller than the 0.8V voltage applied on the non-inverting input node U7$_+$, the comparator U7 will output a high level voltage of 5V.

The switching circuit 32 includes two MOSFETs (metal-oxide-semiconductor field effect transistors) Q1, Q2 and a resistor R31. The gate G of Q2 is connected to the output terminal of the comparator U7 of the control circuit 30, the source S of Q2 is connected to ground (GND) and the drain D of Q2 is connected to the gate G of Q1. The source S of Q1 is connected to the battery 100, and the drain D of Q1 is connected to the system 150. The resistor R31 is connected between the source S of Q1 and the gate G of Q1. In this embodiment, Q2 is an N-channel enhancement mode MOSFET, which has a positive threshold voltage. When the bias voltage applied between the gate G and the source S of Q2 is larger than the positive threshold voltage of Q2, Q2 turns on. Q1 is a P-channel enhancement mode MOSFET. Q1 is different from Q2 in that Q1 requires a negative threshold voltage, and Q1 turns on when the absolute value of the voltage applied between the gate G and the source S of the Q1 is larger than the absolute value of the negative threshold voltage of Q1. For the benefit of description and understanding, it is assumed that the negative threshold voltage of Q1 is −4.5V and that the positive threshold voltage of Q2 is 4.5V. The switching circuit 32 switches between ON and OFF according to the output voltage outputted by the output terminal of the comparator U7. When the switching circuit 32 turns off, the battery 100 cannot supply power to the system 150 since Q1 is in a cut-off state. The working principle of the switching circuit 32 will be described in detail hereinafter.

The feedback circuit 40 includes an N-channel enhancement mode MOSFET Q3, which has same parameters and works under the same principle as Q2 of the switching circuit 32. The gate G of Q3 is electrically connected to a feedback terminal 152 of the system 150, the source S of Q3 is connected to ground (GND) and the drain D of Q3 is electrically connected to the power supply pin V$_{dd}$ of the tri-axis accelerometer 22. When the battery 100 has already steadily installed onto the system 150, the system gets power from the battery 100 and immediately the feedback terminal 152 outputs a voltage of 5V to the gate G of Q3.

The working principle of the battery protecting circuit will hereinafter be explained in greater detail wherein a notebook computer is taken as an example of the system 150. It is presumed that the operating voltage of the notebook computer is 20V. In this regard, the battery 100 should output a direct current voltage of 20V when it works.

When the battery 100 is being installed onto or uninstalled from the notebook computer 150 by users, the battery 100 is invariably in an unstable state, i.e., the battery 100 is in a state of motion. The sensors in the tri-axial accelerometer 22 detect the accelerations along each axis and then output through the three axes voltages that are proportional to the accelerations in the respective axes. The voltage outputted by at least one of the three axes of the tri-axial accelerometer 22 will exceed the voltage range of 2.4V~2.6V (for X and Y axes) or the voltage range of 3.1V~3.3V (for Z-axis), which makes at least one of the comparators U1, U2, U3, U4, U5, U6 output a high level voltage of 5V. As such, the fifth OR gate 265 will finally output a high level voltage of 5V through its output terminal. Since the high level voltage of 5V outputted by the output terminal of the fifth OR gate 265 is directly applied to the inverting-input node U7_ of the comparator U7, the comparator U7 will output a low level voltage of 0V through its output terminal to the switching circuit 32 as 5V is larger than the 0.8V voltage applied on the non-inverting input node U7$_+$. Since the output terminal of the comparator U7 is connected to the gate G of Q2, the bias voltage applied between the gate G and the source S of Q2 is 0V, and Q2 turns off according to the characteristic of N-channel enhancement mode MOSFET. When Q2 turns off, the bias voltage applied between the gate G and the source S of Q1 is 0V too, and Q1 turns off. As a result, the battery 100 can not power the notebook computer 150 so long as the battery 100 is in an unstable state, for example, when the battery 100 is being installed onto or removed from the notebook computer 150.

When the battery 100 is in a stable state, for example, when the battery 100 has been installed onto the notebook computer 150 to supply power thereto, the tri-axial accelerometer 22 is still, and the output voltage by each of the X and Y axes of the tri-axial accelerometer 22 is 2.5V, which falls into the range between 2.4V and 2.6V, and the output voltage by the Z-axis of the tri-axial accelerometer 22 is 3.2V, which falls into the range between 3.1V and 3.3V. Thus, the comparators U1, U2, U3, U4, U5, U6 of the comparing circuit 24 each output a low level voltage of 0V, which causes the fifth OR gate 265 of the choosing circuit 26 to finally output a low level voltage of 0V. The low level voltage of 0V is inputted into the inverting-input node U7_ of the comparator U7. Since the voltage applied on the non-inverting input node U7$_+$ of the comparator U7 is 0.8V, the comparator U7 after comparison will output a high level voltage of 5V through its output terminal. Therefore, the bias voltage applied between the gate G and the source S of Q2 is 5V, which is larger than the positive threshold voltage of Q2 thus turning Q2 on. When Q2 turns on, the drain D and the source S of Q2 become conductive, and a current flows through the resistor R31, and the bias voltage applied between the gate G and the source S of Q1 is −5V, the absolute value of which is larger than the absolute value of the negative threshold voltage of Q1, and Q1 turns on. The drain D and the source S of Q1 become conductive, and the battery 100 is capable of supplying power to the notebook computer 150. Immediately thereafter, the feedback terminal 152 of the notebook computer 150 outputs a high voltage of 5V to the gate G of Q3. Thus, the bias voltage applied between the gate G and the source S of Q3 is 5V, which is larger than the positive threshold voltage of Q3 and Q3 turns on. The drain D and the source S of Q3 become conductive. As a result, the electrical connection between the first voltage output terminal 161 of the regulated power supply 10 and the power supply pin $V_{dd}$ of the tri-axis accelerometer 22 is cut off and the tri-axis accelerometer 22 stops working.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery protecting circuit being configured to control a battery to power a system, the protecting circuit comprising:
   a control circuit adapted for being connected between the battery and the system; and
   a sensing circuit including a tri-axial accelerometer having X-axis, Y-axis and Z-axis, the tri-axial accelerometer being capable of detecting position changes of the battery and outputting through the X, Y and Z axes voltages that correspond to the position changes, the sensing circuit ultimately outputting a controlling voltage to the control circuit according to the voltages outputted by the X, Y and Z axes, when the battery is in an unstable state, the controlling voltage outputted by the sensing circuit makes the control circuit OFF and the battery cannot power the system; when the battery is in a stable state, the controlling voltage outputted by the sensing circuit makes the control circuit ON and the battery supplies power to the system.

2. The battery protecting circuit as described in claim 1, wherein the control circuit comprises a comparator, at least one schottky barrier diode and a switching circuit, one of a non-inverting input node and an inverting-input node of the comparator is connected to the battery via at least a resistor, the at least one schottky barrier diode is connected between the one of the non-inverting input node and the inverting-input node of the comparator and ground (GND), the other one of the non-inverting input node and the inverting-input node of the comparator is connected to the controlling voltage of the sensing circuit, and an output terminal of the comparator is connected to the switching circuit.

3. The battery protecting circuit as described in claim 2, wherein the switching circuit comprises two MOSFETs (metal-oxide-semiconductor field effect transistors) and at least a resistor, the two MOSFETs including a P-channel enhancement mode MOSFET whose source is connected to the battery and an N-channel enhancement mode MOSFET whose gate is connected to the output terminal of the comparator of the control circuit, a source of the N-channel enhancement mode MOSFET being connected to ground (GND), and a drain of the N-channel enhancement mode MOSFET being connected to a gate of the P-channel enhancement mode MOSFET, the at least a resistor being connected between the source and the gate of the P-channel enhancement mode MOSFET, a drain of the P-channel enhancement mode MOSFET adapted for being coupled to the system.

4. The battery protecting circuit as described in claim 1, wherein the sensing circuit further comprises a choosing circuit and a comparing circuit connected between the tri-axial accelerometer and the choosing circuit, the comparing circuit including a plurality of comparators each having a non-inverting input node and an inverting-input node, one of the non-inverting input node and the inverting-input node of each of the comparators being connected to a corresponding one of the X, Y and Z axes of the tri-axial accelerometer, the other one of the non-inverting input node and the inverting-input node of each of the comparators being connected to a base voltage, the comparators each having an output terminal connected to the choosing circuit.

5. The battery protecting circuit as described in claim 4, further comprising a regulated power supply which includes a plurality of dividing circuits, one of the dividing circuits being electrically connected to a power supply pin of the tri-axis accelerometer, the other ones of the dividing circuits being electrically connected to the corresponding comparators and providing for the base voltages.

6. The battery protecting circuit as described in claim 5, further comprising a feedback circuit connected between the tri-axis accelerometer and the system, the feedback circuit comprising an N-channel enhancement MOSFET whose gate is electrically connected to a feed back terminal of the system, a source of the MOSFET connected to ground (GND) and a drain of the MOSFET connected to the power supply pin of the tri-axis accelerometer, an electrical connection between the regulated power supply and the power supply pin of the tri-axis accelerometer being interrupted by the feedback circuit when the battery is in the stable state.

7. The battery protecting circuit as described in claim 5, wherein the comparing circuit comprises six comparators and the choosing circuit includes five OR gates each having two input terminals and an output terminal, the six output terminals of the six comparators connected respectively to the six input terminals of first, second and third OR gates among the five OR gates in the choosing circuit, the two output terminals of two OR gates among the first, second and third OR gates connected to the two input terminals of a fourth OR gate among the five OR gates, the output terminal of the third OR gate and the output terminal of the fourth OR gate connected to the two input terminals of a fifth OR gate among the five OR gates.

8. The battery protecting circuit as described in claim 7, wherein the six comparators are consisted of first comparator, second comparator, third comparator, fourth comparator, fifth comparator and sixth comparator, the non-inverting input node of the first comparator and the inverting input node of the second comparator both connected to the X-axis of the tri-axial accelerometer, the non-inverting input node of the third comparator and the inverting input node of the fourth comparator both connected to the Y-axis of the tri-axial accelerometer, the non-inverting input node of the fifth comparator and the inverting input node of the sixth comparator connected to the Z-axis of the tri-axial accelerometer.

9. The battery protecting circuit as described in claim 8, wherein the regulated power supply comprises five dividing circuits and five voltage output terminals connected to the five dividing circuits respectively, one of the voltage output terminals connected to the power supply pin of the tri-axial accelerometer, another one of the voltage output terminals connected to the inverting input nodes of the first and third comparators of the comparing circuit, further another one of the voltage output terminals connected to the non-inverting input nodes of the second and fourth comparators of the comparing circuit, the other two ones of the voltage output terminals connected respectively to the inverting input node of the fifth comparator and the non-inverting input node of the sixth comparator of the comparing circuit.

10. A battery for powering an electronic system, the battery comprising a protecting circuit therein, the protecting circuit including:
   a control circuit connected between the battery and the electronic system; and
   a sensing circuit including a tri-axial accelerometer having X-axis, Y-axis and Z-axis, the tri-axial accelerometer being capable of detecting position changes of the battery and outputting through the X, Y and Z axes voltages that correspond to the position changes, the sensing circuit ultimately outputting a controlling voltage to the control circuit according to the voltages outputted by the X, Y and Z axes, when the battery is in an unstable state, the controlling voltage outputted by the sensing circuit turns the control circuit OFF and the battery cannot power the electronic system; when the battery is in a stable state, the controlling voltage outputted by the sensing circuit turns the control circuit ON and the battery supplies power to the electronic system.

11. The battery as described in claim 10, wherein the control circuit comprises a comparator and at least a MOSFET (metal-oxide-semiconductor field effect transistor), the comparator having a first input node and a second input node, one of the first and second input nodes being applied with a base voltage, the other one of the first and second input nodes being connected to the controlling voltage of the sensing circuit, an output terminal of the comparator being connected to the at least a MOSFET, the at least a MOSFET being connected between the battery and the electronic system to control the ON/OFF operation.

12. The battery as described in claim 10, wherein the sensing circuit further comprises a choosing circuit and a comparing circuit connected between the tri-axial accelerometer and the choosing circuit, the comparing circuit including a plurality of comparators each having a first input node and a second input node, one of the first and second input nodes of each of the comparators being connected to a corresponding one of the X, Y and Z axes of the tri-axis accelerometer, the other one of the first and second input nodes of each of the comparators being connected to a base voltage, the comparators each having an output terminal connected to the choosing circuit.

13. The battery as described in claim 12, further comprising a regulated power supply which includes a plurality of dividing circuits, one of the dividing circuits being electrically connected to a power supply pin of the tri-axis accelerometer, the other ones of the dividing circuits being electrically connected to the corresponding comparators and providing for the base voltages.

14. The battery as described in claim 10, further comprising a feedback circuit connected between the power supply pin of the tri-axis accelerometer and a feedback terminal of the electronic system, the feedback circuit comprising at least a MOSFET, the at least a MOSFET controlling an electrical connection between a power supply and the power supply pin of the tri-axis accelerometer.

15. The battery as described in claim 14, wherein the electronic system is a portable electronic device selected from the group consisting of notebook computer, tablet PC, and UMPC (Ultra Mobile PC).

* * * * *